US006690784B2

(12) United States Patent
Renner et al.

(10) Patent No.: US 6,690,784 B2
(45) Date of Patent: Feb. 10, 2004

(54) CALLER SELECT WITH MEMORY FOR TELEPHONE NUMBER PROGRAMMING AND REVIEW

(76) Inventors: Karl Renner, 7415 Hundley, Dallas, TX (US) 75231; Darwin Renner, 1314 Cedar Hill Ave., Dallas, TX (US) 75208

(*) Notice: Subject to any disclaimer, the term of this patent is extended or adjusted under 35 U.S.C. 154(b) by 371 days.

(21) Appl. No.: 09/681,240

(22) Filed: Mar. 3, 2001

(65) Prior Publication Data

US 2002/0141558 A1 Oct. 3, 2002

(51) Int. Cl.[7] .............................................. H04M 3/42
(52) U.S. Cl. ........................... 379/210.02; 379/211.02; 379/142.06
(58) Field of Search .................. 379/210.02, 211.02, 379/201.01, 207.16, 142.06

(56) References Cited

U.S. PATENT DOCUMENTS 5,220,599 A * 6/1993 Sasano et al. ......... 379/142.06
6,026,152 A * 2/2000 Cannon et al. ......... 379/142.06

* cited by examiner

*Primary Examiner*—Benny Tieu

(57) ABSTRACT

Caller Select allows the user to select incoming telephone numbers in the Caller ID that he wishes to receive and will ring the telephone 34; all other numbers will be rejected and not allowed to ring the telephone 34. Numbers may programmed either by pressing an enter switch 24 during a review controlled by a switch 26 or by going into the program mode by pressing a mode switch 22 and pressing buttons on a touch tone phone 34. The operation is controlled by software running in a low power microprocessor 16. The Caller Select mode may be turned off by a switch 28 which in display of the Caller ID only and ringing by all calls.

1 Claim, 4 Drawing Sheets

Caller Select Block Diagram

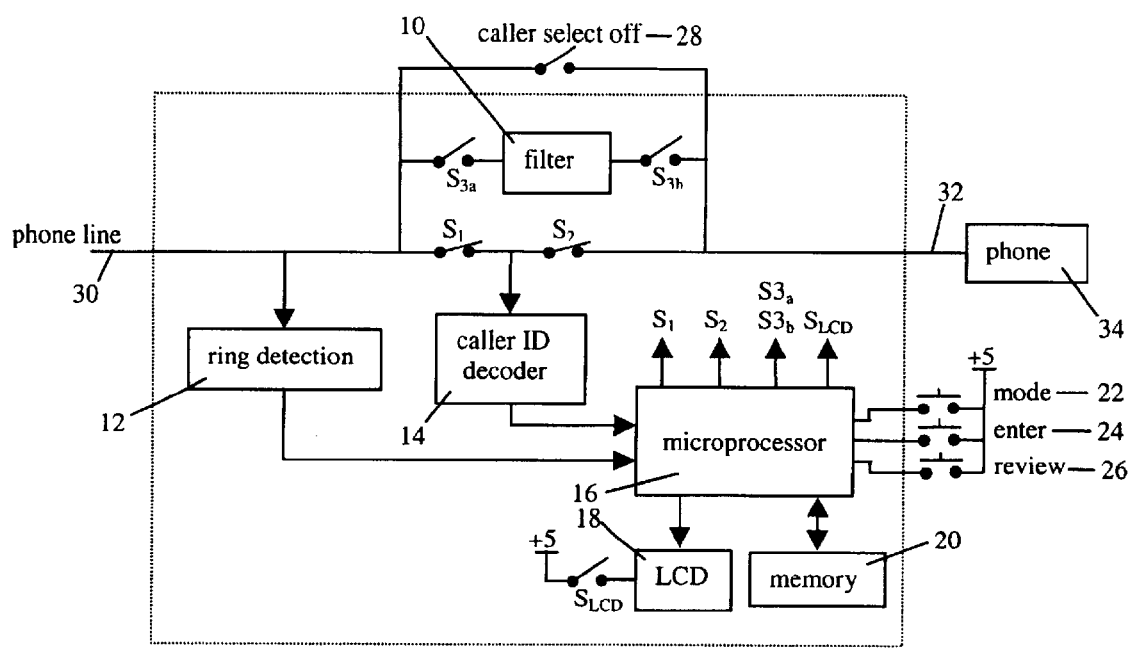
Figure 1. Caller Select Block Diagram

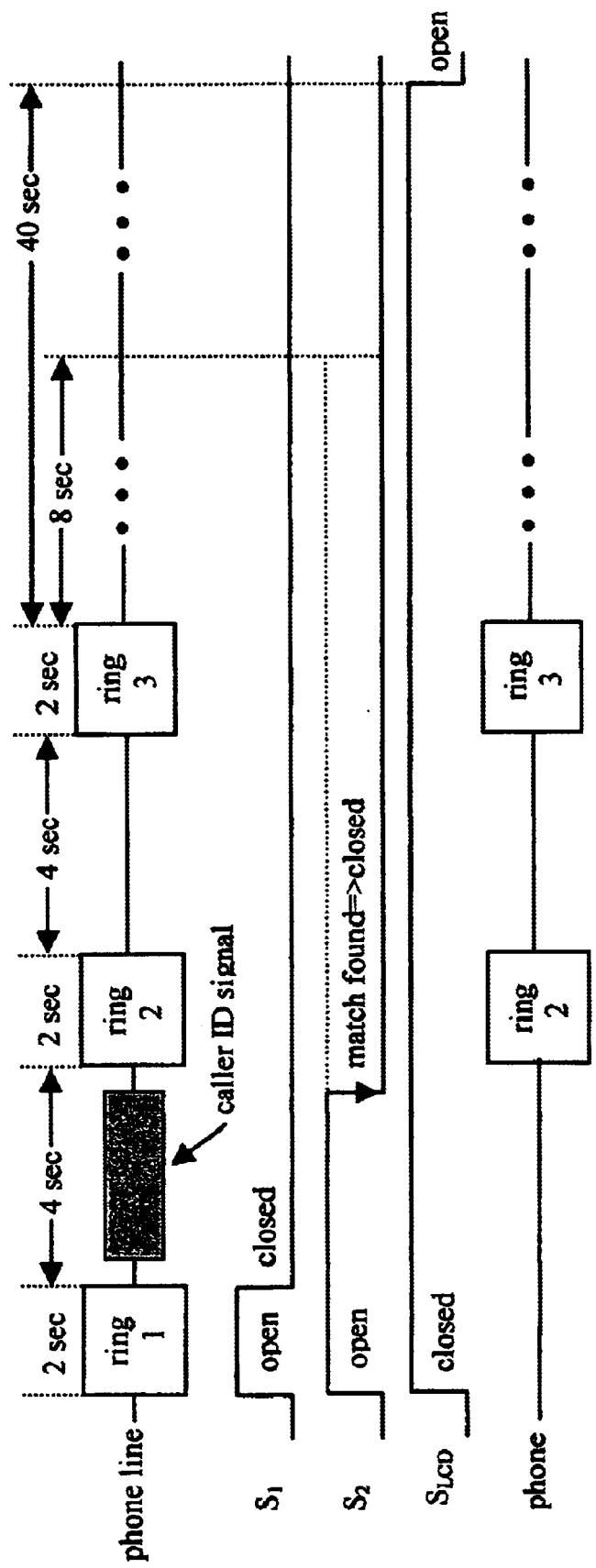
Figure 2. Timing Diagram of Response to Incoming Call

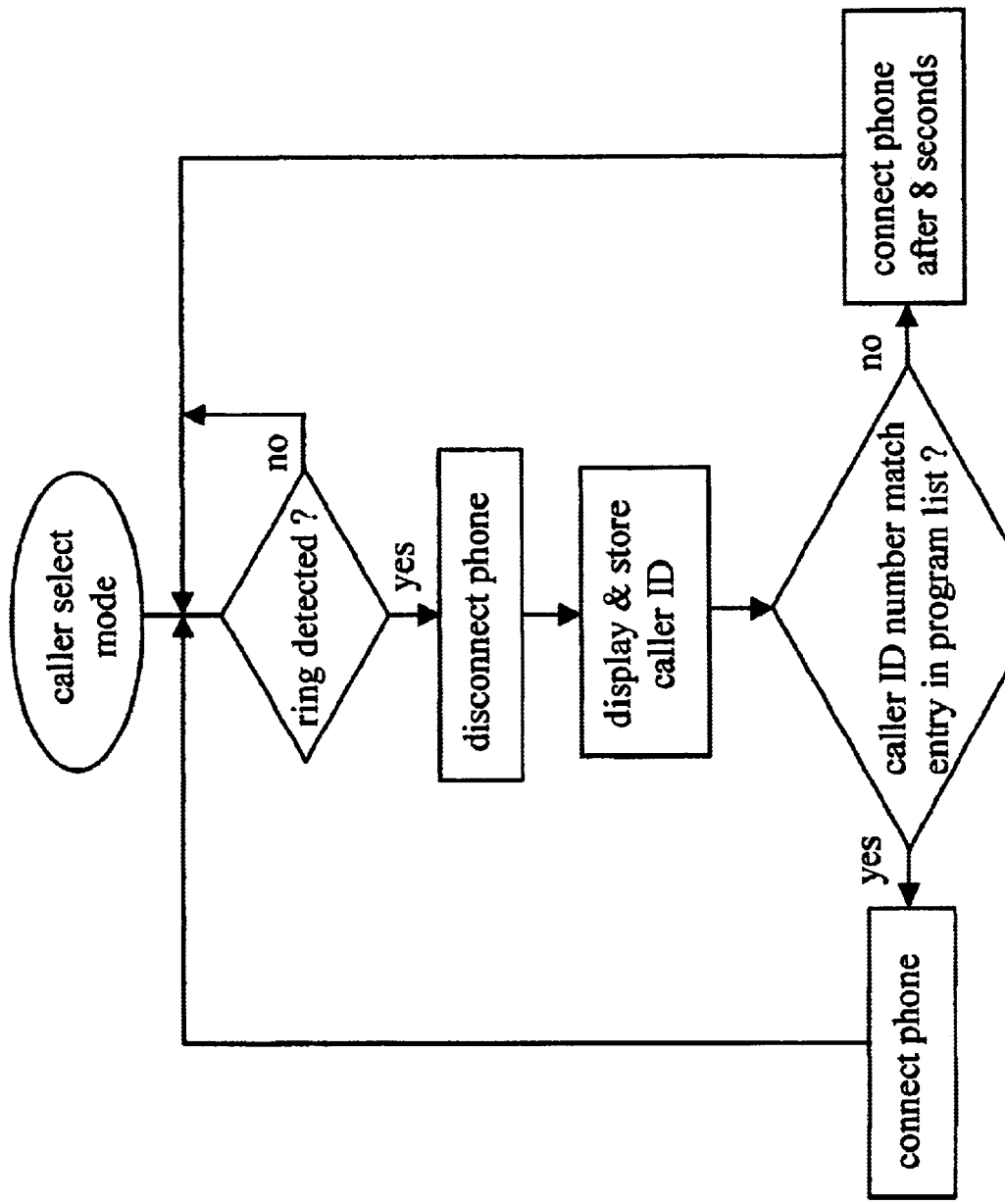
Figure 3. Flowchart of Response to Incoming Call

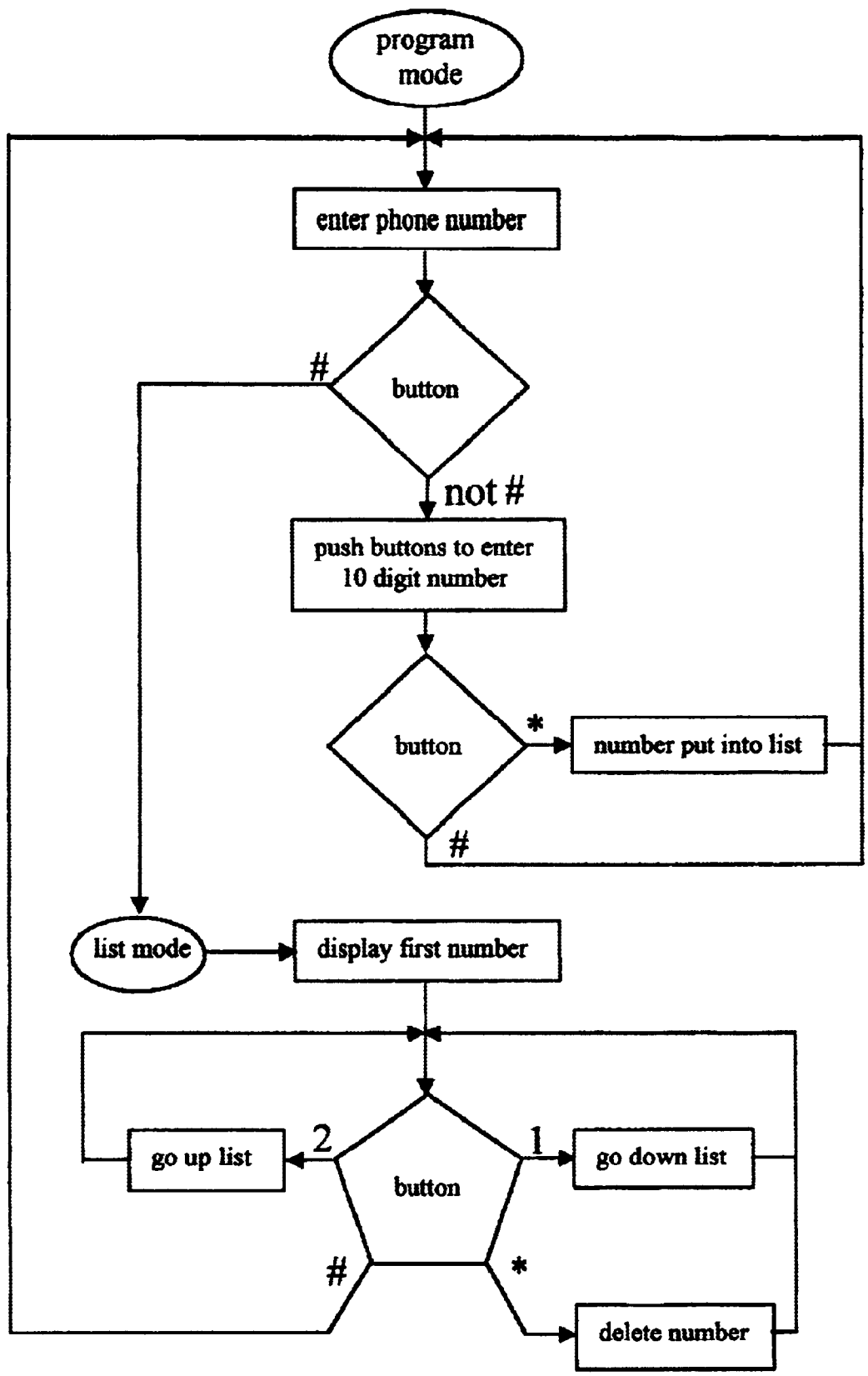
Figure 4. Flowchart for Program and List Modes

CALLER SELECT WITH MEMORY FOR TELEPHONE NUMBER PROGRAMMING AND REVIEW

BACKGROUND OF INVENTION

Southwestern Bell offers a service called Privacy Manager which blocks incoming numbers that are unavailable, anonymous, out of area, or private. The services uses the caller ID to identify the unwanted calls. The service is only available in certain cities. When an unidentified call reaches your phone line the caller hears a message which asks for identification. If given then the call goes through and rings the phone. A message appears on the caller ID box identifying it as a screened call. You have four options to handle the call: accept, reject, send it to an answering machine, or issue a solicitor's rejection message. The service costs $5.00 per month. Verizon will offer a similar service called Call Intercept in 2001. These services only reject calls whose caller ID number is absent. Undesirable calls which have a valid caller ID number will come through and ring the phone.

SUMMARY OF INVENTION

In accordance with the present invention a Caller Select box enables the user to program a list of desired numbers. When an incoming number matches a number in the list the phone is allowed to ring.

BRIEF DESCRIPTION OF DRAWINGS

FIG. 1 illustrates a block diagram of the Caller Select box.

FIG. 2 illustrates a timing diagram for the response of the box to an incoming call.

FIG. 3 illustrates a flowchart of the software which controls the response of the box to an incoming call.

FIG. 4 illustrates a flowchart which the program mode in which numbers may be entered into the list, deleted, and displayed.

Reference numerals in drawings are shown below.

| | |
|---|---|
| 10 | filter |
| 12 | ring detection |
| 14 | caller ID decoder |
| 16 | microprocessor |
| 18 | liquid crystal display |
| 20 | memory |
| 22 | mode switch |
| 24 | enter switch |
| 26 | review switch |
| 28 | caller select off switch |
| 30 | input phone line |
| 32 | output to phone |

DETAILED DESCRIPTION

There are two modes of operation: Caller Select and program. During Caller Select mode the caller's name and number and time and date appear in a liquid crystal display (LCD). If the caller ID number matches a number in a programmed list of numbers then the phone rings else it does not ring. Program mode allows the user to program numbers into the list by pushing the buttons on the phone; numbers may also be listed and deleted. The Caller Select function may turned off, the box simply displays the caller ID, and the phone always rings.

A block diagram of Caller Select is shown in FIG. 1. The phone line is connected to the input 30 and the phone 34 to the output 32. Switches $S_1$, $S_2$, $S_{3a}$ and $S_{3b}$ are solid state relays controlled by the microprocessor 16. $S_{LCD}$ is an analog switch controlled by the microprocessor 16 which supplies power to the liquid crystal display (LCD) 18. The caller select off switch 28 is an external toggle switch for the user. There are three push button switches on the front panel. The mode switch 22 toggles between Caller Select and program modes. The review switch 26 displays previous numbers starting with the last number received; as each number is reviewed it is deleted from memory. The enter switch 24 may be pushed to enter an incoming number or a number during review into the programmed list. Switches $S_1$ and $S_2$ are normally closed so calls can be made from the phone 34. Dual switches $S_{3a}$ and $S_{3b}$ are normally open and are used in the program mode. The caller select switch off 28 is normally open; when closed it turns off the caller select mode and connects the input directly to the phone 34.

FIG. 2 illustrates the response of Caller Select to an incoming call. The caller ID information is received between the first and second ring of an incoming call. The ring detection block 12 outputs a signal to the microprocessor 16 which generates an interrupt that initializes for the receipt of the serial data which is output from the caller ID decoder 14. $S_1$ and $S_2$ opens which disconnects the phone from the line and prevents its from ringing. $S_1$ closes after the first ring so that the caller ID data may be received by the decoder 14; the time/date, phone number, and name of the caller is displayed in the liquid crystal display (LCD) 18 and is also stored in memory 20 for later review. If the incoming number matches a number in the programmed list of numbers then the phone 34 is connected to the phone line 30 by closing $S_2$ and allowing the phone 34 to ring starting with the second ring. If there is no match then $S_2$ remains open; $S_2$ will close and reconnect the phone 8 seconds after the final ring so that the next call can be received or an outgoing call can be made. The switch controls are digital outputs from the microprocessor under software control. Display information is written to the LCD 18 over a 8 bit data bus which has three control lines consisting of a read/write, register select, and an enable signal. FIG. 3 illustrates a flowchart for the software that runs in the microprocessor 16 and controls the Caller Select response.

The program mode allows the user to enter numbers into the list by pushing the touch tone phone buttons 34. Switch $S_1$ is opened so that the phone tones do not go out directly to the line 30 and initiate a call. $S_2$ is closed so that the phone tones are fed to the caller ID decoder 14 which converts it into a signal compatible with the microprocessor interface. $S_{3a}$ and $S_{3b}$ are closed so that the filter 10 passes the DC line voltage to the phone 34 but blocks the tones from going out on the line 30. The phones tones which is an analog signal are converted to digital by an analog to digital converter in the microprocessor 16, digitally filtered, and decoded such that the corresponding phone button 34 can be identified.

FIG. 4 illustrates a flowchart which describes the process. It consists of the program mode followed by the list mode. Ten digit numbers are entered by pushing the phone buttons 34. After the number is entered then OK? is displayed. The * button is pressed to actually enter the number into the list; the # button is pressed to abort and start over again. To enter the list mode the # button is pressed before entering a new number. The numbers in the programmed list may be displayed by pressing the 1 button to go down the list and the 2 button to go up the list. A number may be deleted at any time by pressing the * button. Return to the program mode is done by pressing the # button.

What is claimed is:

1. A method for select desired telephone calls that ring a phone, comprising:
   (a) a microprocessor that executes software in response to interrupts generated by:
       (1) detection of a ring signal of an incoming call,
       (2) a mode switch which enables program mode or Caller Select mode,
       (3) a enter switch which enters a number into a programmed list, and
       (4) a review switch which enables the review of previous calls,
   (b) a memory for storage of incoming caller ID data and said programmed list of numbers,
   (c) a LCD display which displays current and previous caller ID information and telephone numbers,
   (d) said solid state relay switches which connect the phone to a phone line when desired calls are received,
   (e) a filter which blocks phone tones from going out on the line during program mode, and
   (f) a external switch which disables Caller Select mode whereby when in Caller Select mode said phone is connected to the phone line and allowed to ring only if an incoming number matches an entry in a programmed list of numbers and whereby when in Caller Select mode phone numbers are entered into said programmed list by pressing the enter switch or when in program mode by pressing said phone buttons and whereby Caller Select mode can be disabled by an external switch thereby enabling the box to display caller ID and pass all calls to said phone.

* * * * *